Figure 1:
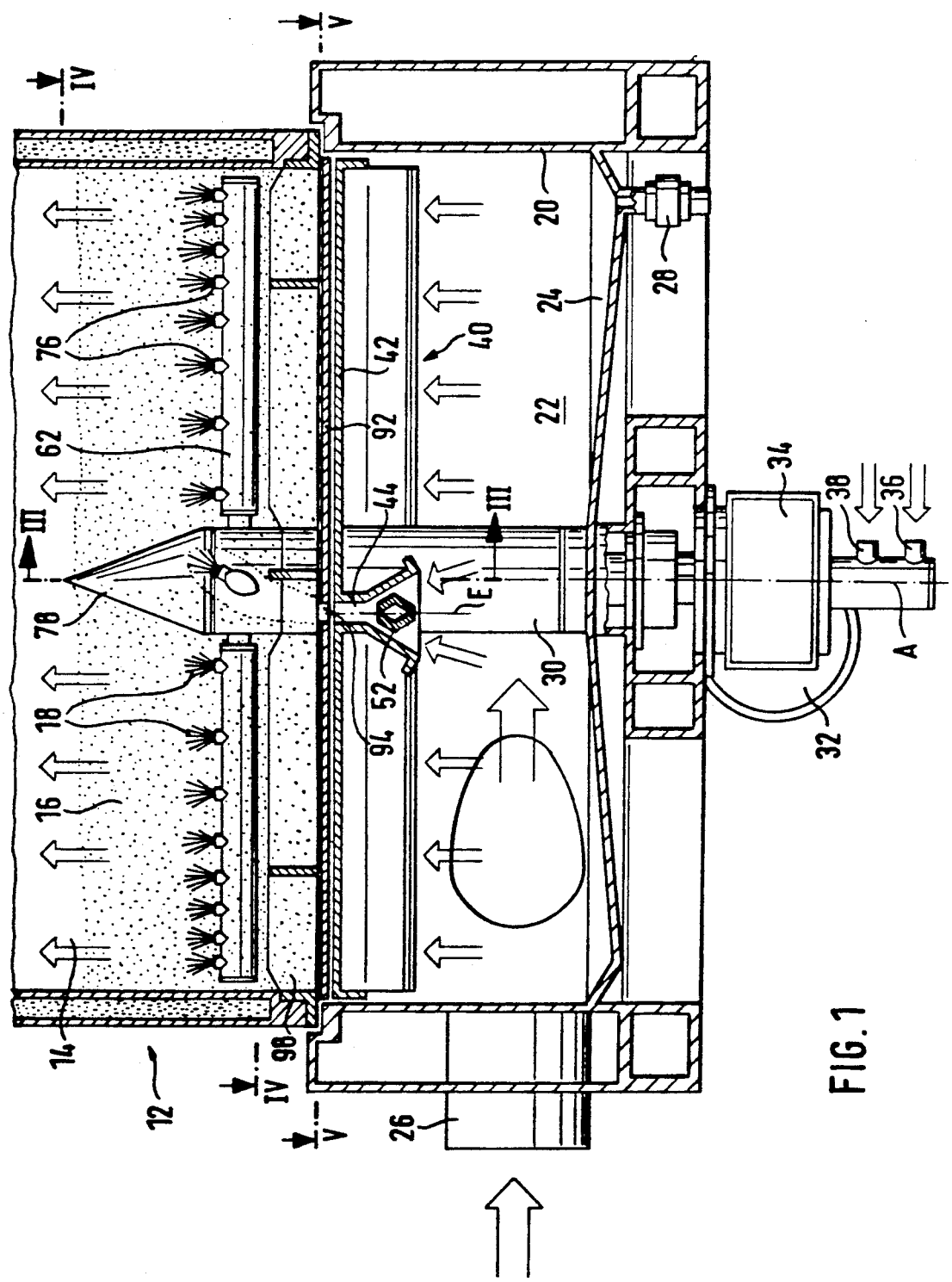

United States Patent [19]

Hüttlin

[11] Patent Number: 5,085,170
[45] Date of Patent: Feb. 4, 1992

[54] FLUIDIZED BED APPARATUS, IN PARTICULAR FOR GRANULATION OF PULVERULENT SUBSTANCE

[76] Inventor: Herbert Hüttlin, Daimlerstrasse 7, 7853 Steinen, Fed. Rep. of Germany, 7853

[21] Appl. No.: 445,737

[22] PCT Filed: Feb. 28, 1989

[86] PCT No.: PCT/EP89/00194
§ 371 Date: Oct. 25, 1989
§ 102(e) Date: Oct. 25, 1989

[87] PCT Pub. No.: WO89/07978
PCT Pub. Date: Sep. 8, 1989

[30] Foreign Application Priority Data

Mar. 1, 1988 [DE] Fed. Rep. of Germany ....... 3806543

[51] Int. Cl.$^5$ .................................................. B05C 5/02
[52] U.S. Cl. ................................. 118/303; 34/57 A; 118/323; 118/DIG. 5; 427/213
[58] Field of Search ................. 118/303, 19, 313, 323, 118/315, DIG. 5; 34/10, 57 R, 57 A; 427/213

[56] References Cited

U.S. PATENT DOCUMENTS

| | | | |
|---|---|---|---|
| 3,386,182 | 6/1968 | Lippert | 118/303 X |
| 3,849,900 | 11/1974 | Dale et al. | 34/10 |
| 4,724,794 | 2/1988 | Itoh | 118/303 |
| 4,740,390 | 4/1988 | Kulling | 118/DIG. 5 |
| 4,834,299 | 5/1989 | Kishibata et al. | 427/213 X |

FOREIGN PATENT DOCUMENTS

| | | |
|---|---|---|
| 2321418 | 11/1973 | Fed. Rep. of Germany . |
| 2551578 | 5/1977 | Fed. Rep. of Germany . |
| 2932803 | 3/1981 | Fed. Rep. of Germany . |
| 3107959 | 9/1982 | Fed. Rep. of Germany . |
| 2021968 | 12/1979 | United Kingdom . |

Primary Examiner—Richard L. Chiesa
Attorney, Agent, or Firm—Brumbaugh, Graves, Donohue & Raymond

[57] ABSTRACT

In a container (12) a treatment space (14) for substance (16) is arranged and therebelow a wind chamber (22). The wind chamber (22) is defined upwardly by a circular rotor disc (42) which is rotatable drivably about an upright central (42) which is rotatable drivably about an upright central axis (A) and has at least one opening (44) which is elongated in approximately radial direction and which allows a gas stream (50) from the wind chamber (22) into the treatment space (14). The rotor disc (42) forms the sole partition between wind chamber (22) and treatment space (14). Associated with the or each opening (44) of the rotor disc (42) is a closure means which is opened in normal operation but is closable for stopping the apparatus. Stationarily arranged above the rotor disc (42) is at least one retaining blade (98) which prevents substance lying on the rotor (40) from rotating with the latter. In each gas stream (50) which has passed through one of the openings (44) distributed over the radial length thereof and rotating therewith on rotation of the rotor (40) nozzles (76) are arranged for spraying the substance (16) in the treatment space (14).

12 Claims, 7 Drawing Sheets

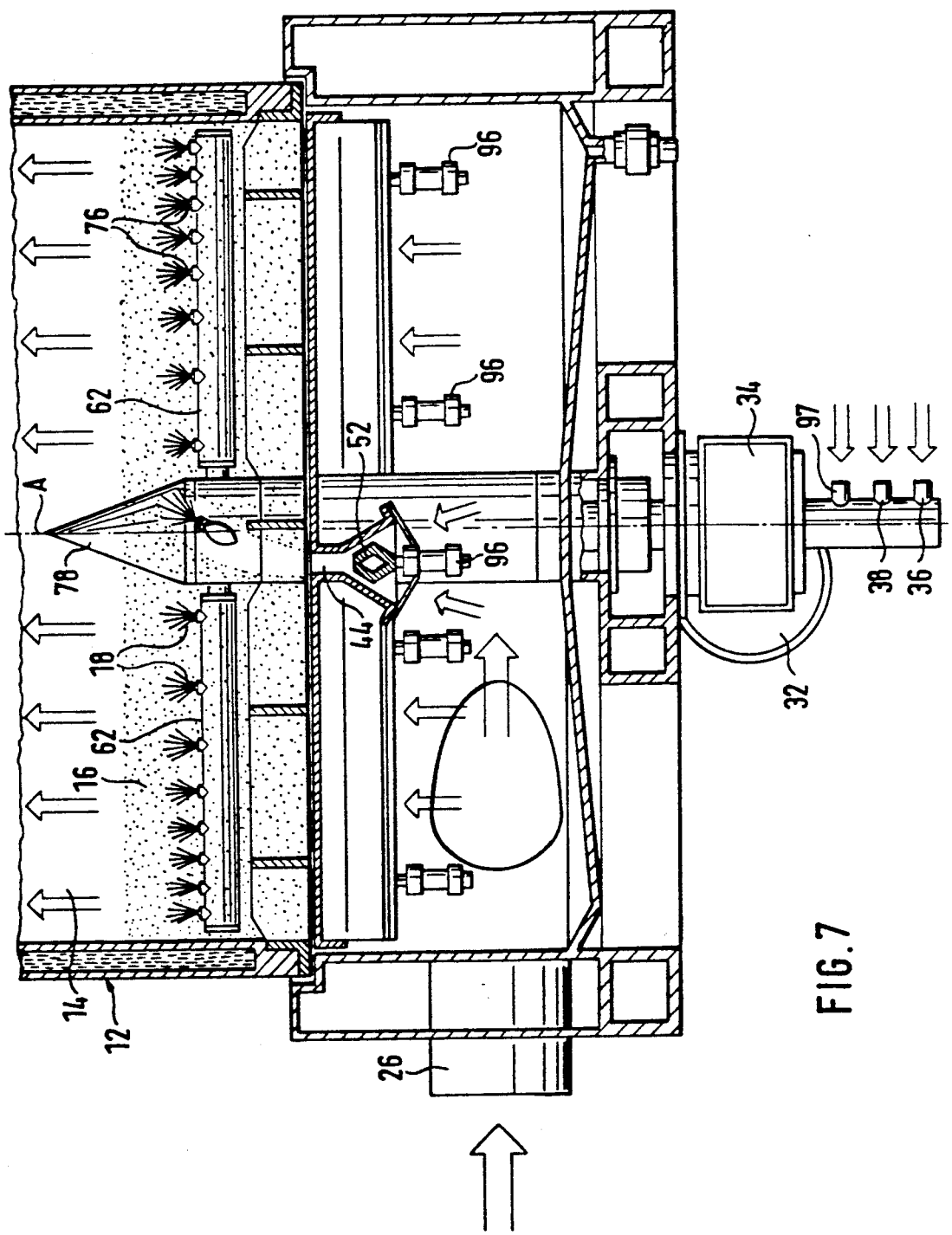

FLUIDIZED BED APPARATUS, IN PARTICULAR FOR GRANULATION OF PULVERULENT SUBSTANCE

The invention relates to a fluidized bed apparatus, in particular for granulation of pulverulent substance, comprising a container in which a treatment space is arranged for the substance and therebelow a wind chamber, and a rotor having a circular rotor disc which defines the wind chamber at the top, is rotatably drivable about an upright central axis and comprises at least one opening which is elongated in approximately radial direction and which permits a gas flow from the wind chamber into the treatment space.

DISCUSSION OF PRIOR ART

In a fluidized bed apparatus belonging to this class and known from U.S. Pat. No. 3,849,900, which is provided for drying particles, the rotor consists of a vertical shaft with a flat circular disc. The latter has a somewhat greater diameter than the sieve bottom and has two or more circular-sector-shaped openings. The sieve bottom belongs to a drawer-like box which can be drawn out of the container and in its operating position is sealed with respect to the container by inflatable hose seals. One of said hose seals lies between a lower frame portion of the box surrounding the sieve bottom or tray and a step formed therebelow in the container. Below said step the rotor disc is disposed. In operation of this known fluidized bed apparatus heated dry air is blown through the rotating rotor and through the sieve bottom into the treatment space so that a pulverulent substance contained therein is fluidized and dried in continuously circulating zones of the treatment space. This known apparatus soils very easily because small particles of the substance to be treated, on insertion of the drawer-like box filled with said substance into the apparatus, can drop through the sieve bottom downwardly into the wind chamber before the pressure gradient between the wind chamber and treatment space necessary for the treatment has developed. The apparatus is as a whole difficult to clean and thus does not always meet the strict hygienic requirements made in particular in the pharmaceutical industry.

Another fluidized bed apparatus known from DE 2932803 A1 comprises a rotor having a U-shaped profile in axial cross-section which is partially covered upwardly by a diaphragm provided with air exit openings. The rotor is mounted on a hollow shaft and connected drivably via the latter and to the pressure side of a fan. Extending upwardly within the hollow shaft is a liquid conduit which terminates in a stationary spray nozzle disposed centrally directly above the sieve bottom. The region around the rotor beneath the sieve bottom is constructed as suction chamber and connected to the suction side of the fan. In this apparatus dry air from the hollow shaft is deflected radially outwardly into the U-shaped rotor profile to flow from there upwardly through the sieve bottom into the treatment space and to fluidize the substance contained therein. Through the central nozzle liquid is sprayed into the fluidized substance so that depending on the nature of the latter and the liquid an agglomeration granulate is for example formed or the particles of the already granulate-like substance are provided with a coating. The used air flows once again through the sieve bottom out of the treatment space into the suction chamber. This apparatus can be filled with the substance to be treated particularly easily pneumatically so that in this respect risks of soiling can be avoided. Nevertheless, cleaning problems arise here as well if the hygienic demands are strict.

More favourable from the hygienic point of view is a fluidized bed apparatus known from DE 2551578 A1 in which a treatment space is defined downwardly by a sealing bottom and upwardly by a filter arrangement. Arranged directly above the bottom is a two-vane or multi-vane rotor which is driven by a hollow shaft and is connected to the pressure side of a fan. The individual vanes of the rotor are provided with air exit openings which are rearwardly directed with respect to the direction of rotation. In one embodiment of this known apparatus in the treatment space a liquid nozzle is disposed centrally above the rotor. In another embodiment liquid nozzles are installed into the vanes of the rotor in such a manner that liquid is sprayed specifically into zones of the treatment space in which the substance is fluidized by the air emerging from the rotor.

Common to both the apparatuses known from DE 2932803 A1 and DE 2551578 A1 is the fact that the air used for fluidizing the substance in the treatment space is deflected within the rotor at least twice substantially through a right angle in each case before it reaches the treatment space. As a result a high expenditure of energy is necessary to cause the air, or other gas, to flow out of the rotor with a velocity and a distribution which make it possible to as it were furrow through the substance to be treated with one or more defined gas streams and thereby achieve an efficient treatment.

Finally, DE 3107959 discloses a fluidized bed apparatus in which a treatment space is separated by a smooth rotor disc from a wind chamber arranged below said space. The rotor disc is rotatable within a container about a vertical axis. Between the outer edge of the rotor disc and the inner wall of the container an annular gap is provided which is closable with an annular vertically adjustable closure member. Arranged centrally above the rotor in the treatment space is a downwardly directed spray nozzle. For introducing a substance to be treated into the treatment space the closure body assumes a closure position from which it is subsequently lowered into an open position as soon as a predetermined pressure gradient has been established between the wind chamber and the treatment space. The rotor thus freed from the closure body is set in rotation so that it throws radially outwardly the layer of the substance to be treated lying on said rotor. Air flowing through the annular gap from the wind chamber into the treatment space fluidizes the substance in a radially outer annular region of the treatment space; from said annular region the substance flows further up again into a centre region of the treatment space and drops onto the rotor disc by which it is again thrown outwardly. In this mode of operation the centrifugal action of the necessarily relatively rapidly revolving rotor plays a major part. Thus, apart from the fluidizing by air or another gas the mechanical action of the rotor and also of the container wall forms a considerable part of the treatment of the substance. Such mechanical actions however are not desirable, or desirable only within narrow limits, in many treatment processes, in particular in granulation.

The problem underlying the invention is to configure a fluidized bed apparatus in such a manner that it is relatively easy to keep clean, requires comparatively little energy and time consumption per unit weight of the substances to be processed and is particularly suitable for granulation of difficultly fluidizable substances or substances sensitive to mechanical action.

SUMMARY OF INVENTION

The problem is solved according to the invention in that
- the rotor disc is constructed as single partition between wind chamber and treatment space,
- a closure means is associated with the or each opening in the rotor disc and is open in normal operation but can be closed for stopping the apparatus,
- above the rotor disc at least one retaining blade is stationarily arranged which prevents the substance lying on the rotor from rotating with the latter and
- nozzles for spraying the substance in the treatment space are arranged in each gas stream which has passed through one of the openings, said nozzles being distributed over the radial length of said stream and rotating therewith on rotation of the rotor.

The invention eliminates the sieve bottom present in the known apparatuses of this type because the rotor disc with its at least one closable opening itself ensures the separation of wind chamber and treatment space necessary in certain phases of each operating cycle. In operation the only purpose of the rotor is to cause the gas stream or gas streams from the wind chamber passing through the rotor with substantially unchanged approximately axis-parallel flow direction to rotate in the treatment space so that they plough through the substance. For this purpose the rotor need be driven only with a low speed of rotation at which a centrifugal action of the rotor disc is avoided. The at least one retaining blade disposed above the rotor disc moreover resists any entraining of the substance so that the latter is subjected substantially only to the ploughing action of the gas rising in one or more streams. Since they are not dispersed at a sieve bottom said streams are relatively sharply bordered and thus have an action similar to plough blades.

The apparatus according to the invention may be constructed in such a manner that

- the closure means comprises a closure disc which is arranged coaxially with the rotor disc, rotatable with respect to the latter and likewise provided with at least one opening, and
- the openings of the two discs are in alignment with each other in an operating position but are covered with respect to each other in a rest position of the two discs.

In the previously described configuration a for example mechanical or pneumatic drive may be provided for the relative rotation of the closure disc with respect to the rotor disc. However, it is simpler if

- the closure disc is arranged above the rotor disc and freely rotatable with respect thereto between stops in such a manner that
- the closure disc on forward rotation of the rotor assumes the operating position due to a braking action exerted on said disc by the substance and on rearward rotation assumes the rest position.

In another embodiment of the invention at each opening as closure means a valve body elongated in radial direction is arranged. Said body can either be arranged vertically adjustably on the rotor or inflatable to exert its closure action.

The at least one retaining blade according to the invention can exercise its retaining effect in particularly gentle manner if it is arranged at a distance above the rotor which is considerably greater than the greatest dimension which the particles of the finished treated substance, for example in the form of a granulate, have. It may however also be advantageous to arrange a plurality of retaining blades stationarily directly above the rotor. Such retaining blades, which leave free between themselves and the upper side of the rotor only a gap small compared with the particle size, can substantially contribute to keeping the surface of the rotor permanently clean.

It is expedient if the retaining blades are connected together by at least one ring coaxial with the rotor.

It is further advantageous if the or each opening of the rotor is defined by side walls which are arranged in an at least approximately vertical plane and the height of which is at least as large as their spacing from each other. The side walls can considerably contribute to the or each gas stream which leaves the rotor upwardly being sharply defined and thus to promoting its ploughing effect.

Finally, it is advantageous for the valve bodies to be suspended beneath the associated side walls between two upwardly converging guide plates.

BRIEF DESCRIPTION OF THE DRAWINGS

Examples of embodiment of the invention will be described with further details hereinafter with the aid of schematic drawings, wherein:

FIG. 1 is a side view shown partially as axis-parallel section of a first example of embodiment of a fluidized bed apparatus according to the invention, FIG. 2 is an enlarged fragment from FIG. 1, FIG. 3 is the axial partial section III—III in FIG. 1, FIG. 4 is the section IV—IV normal to the axis in FIG. 1, FIG. 5 is the partial section V—V normal to the axis in FIG. 1, FIG. 6 is the section VI—VI in FIG. 5, FIG. 7 is a view corresponding to FIG. 1 of a second example of embodiment of a fluidized bed apparatus according to the invention and FIG. 8 is an enlarged fragment from FIG. 7.

DETAILED DESCRIPTION OF PREFERRED EMBODIMENTS OF THE INVENTION

Both the fluidized bed apparatuses illustrated in FIGS. 1 to 6 and 7 and 8 have a lower frame 10 carrying a container 12. The container 12 contains a cylindrical treatment space 14 which in operation is partially filled with the substance 16 to be treated. The substance 16 is for example pulverulent and in the fluidized state is to be sprayed with the liquid 18 to form a granulate. The container 12 is of usual design and thus illustrated only in the lower region of interest here. The treatment space 14 is expediently bordered at the top by a filter arrangement; examples of such arrangements are known from U.S. Pat. No. 3,849,900 and DE 2551578 A1 cited at the beginning.

The lower frame 10 has a cylindrical casing 20 which encloses a wind chamber 22. The latter is defined at the bottom by a bottom 24 and has an inlet air connection 26 through which a gas, for example dry hot air, can be introduced for fluidizing the substance 16. A drain valve 28 is arranged at the bottom 24. A hollow shaft with vertical geometrical axis A extends through the bottom 24. The shaft 30 is rotationally drivable by a motor 32 via an infinitely variable transmission 34. At the lower end of the hollow shaft 30 a liquid inlet 36 and a compressed air inlet 38 are arranged.

Mounted on the shaft 30 is a rotor 40 which comprises as upper boundary of the wind chamber 22 a circular rotor disc 42. The outer diameter of the rotor disc 42 is approximately as large as the inner diameter of the casing 20 and in the example of embodiment illustrated is somewhat greater than the inner diameter of the container 12 which starts directly above the rotor disc 42. The rotor 40 has a plurality, six in the example illustrated, of openings 44 which are offset at equal angular intervals with respect to each other, of 60° in the example illustrated, and each have the form of a narrow annular sector.

Each of the openings 44 is defined by a pair of vertical radially outwardly diverging side walls 46 which extend from the hollow shaft 30 up to a cylindrical outer collar 48. The side walls 46 and the outer collar 48 are connected together at the top by the rotor disc 42 which is cut away corresponding to the openings 44 so that each of the openings allows a vertical gas stream 50 of circular-sector-shaped cross-section to emerge upwardly out of the wind chamber 22 when a corresponding pressure gradient is generated from the wind chamber 22 to the treatment space 14 by a fan connected to the inlet air connecting piece 26.

Beneath each of the openings 44 a valve body 52 is suspended with a pair of rods 54 on the rotor 40 and guided upwardly displaceably. Each of the valve bodies 52 extends in the same radial direction as the associated opening 44 and like the latter has a cross-section increasing with increasing distance from the axis A. The rods 54 are each vertically adjustably secured to a narrow bridge 56 which bridges the associated opening 44. For this purpose an upper portion of each rod 54 is provided with an external thread and the associated bridge 56 with an internal thread. Around each rod 54 a spring 58 is arranged which bears on the lower side of the associated bridge 56 and tends to hold the valve 52 against the action of said pressure gradient in its lower end position defined by the set length of the rods 54.

Figure 2:
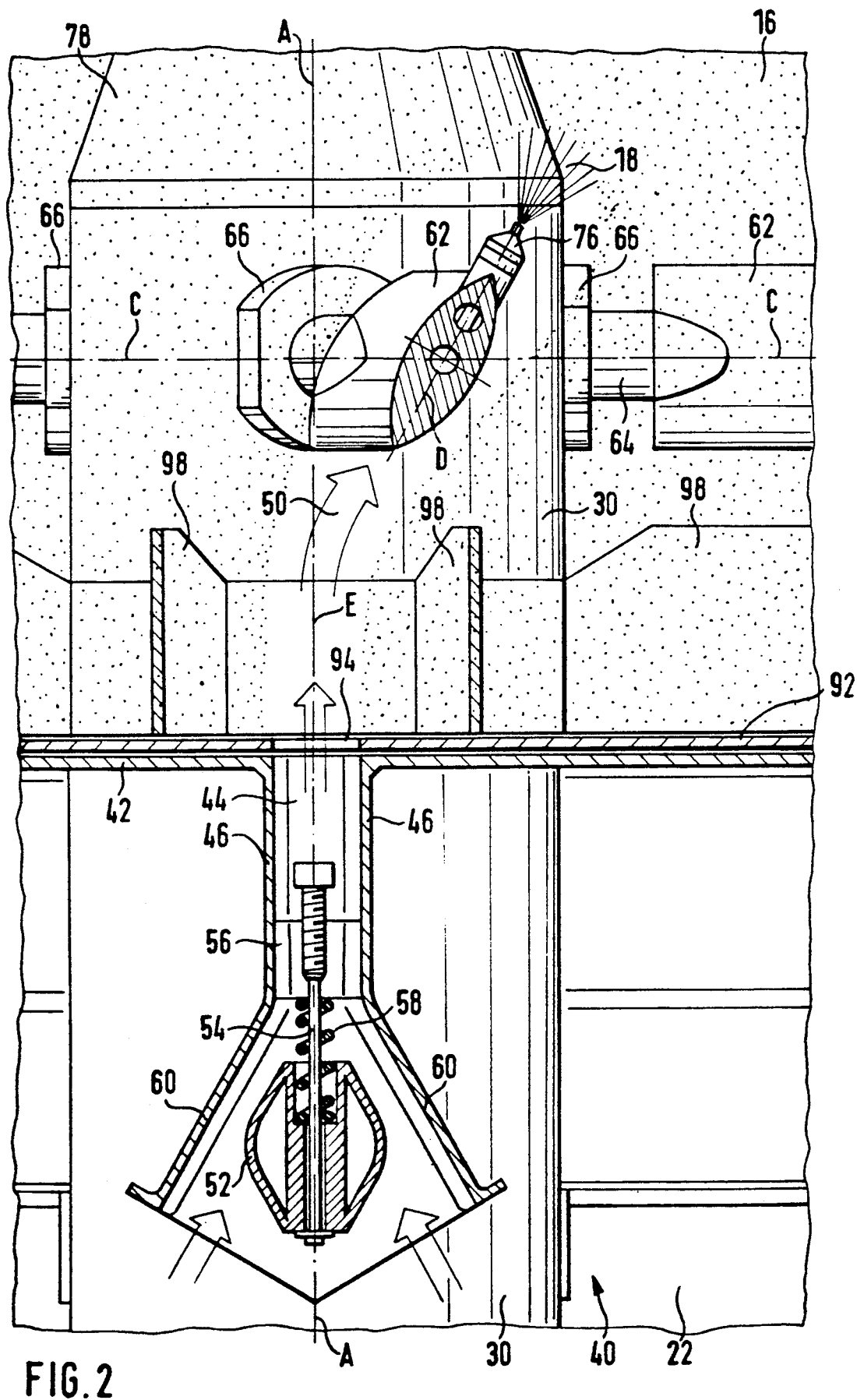
Figure 3:
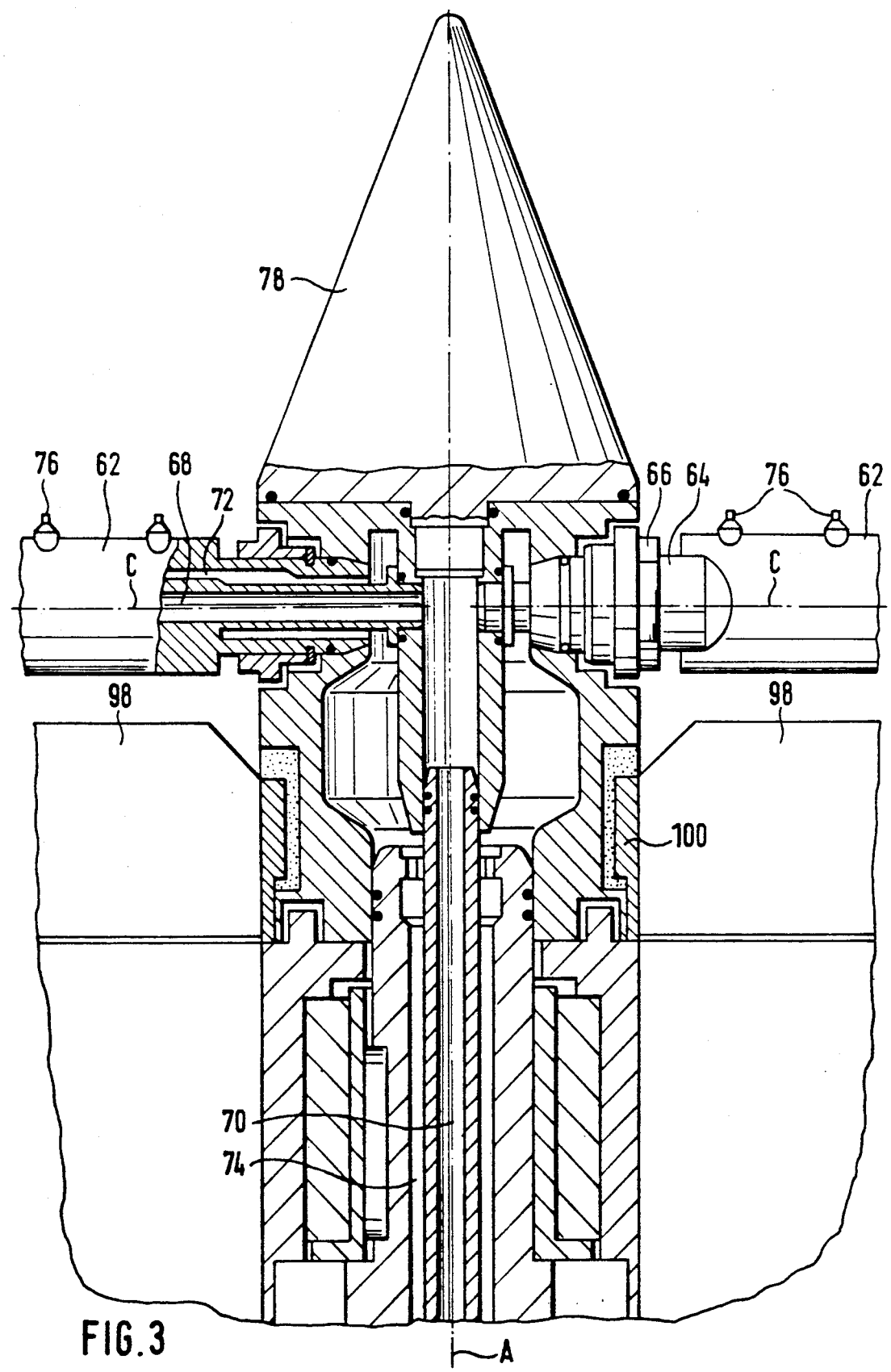
Figure 4:
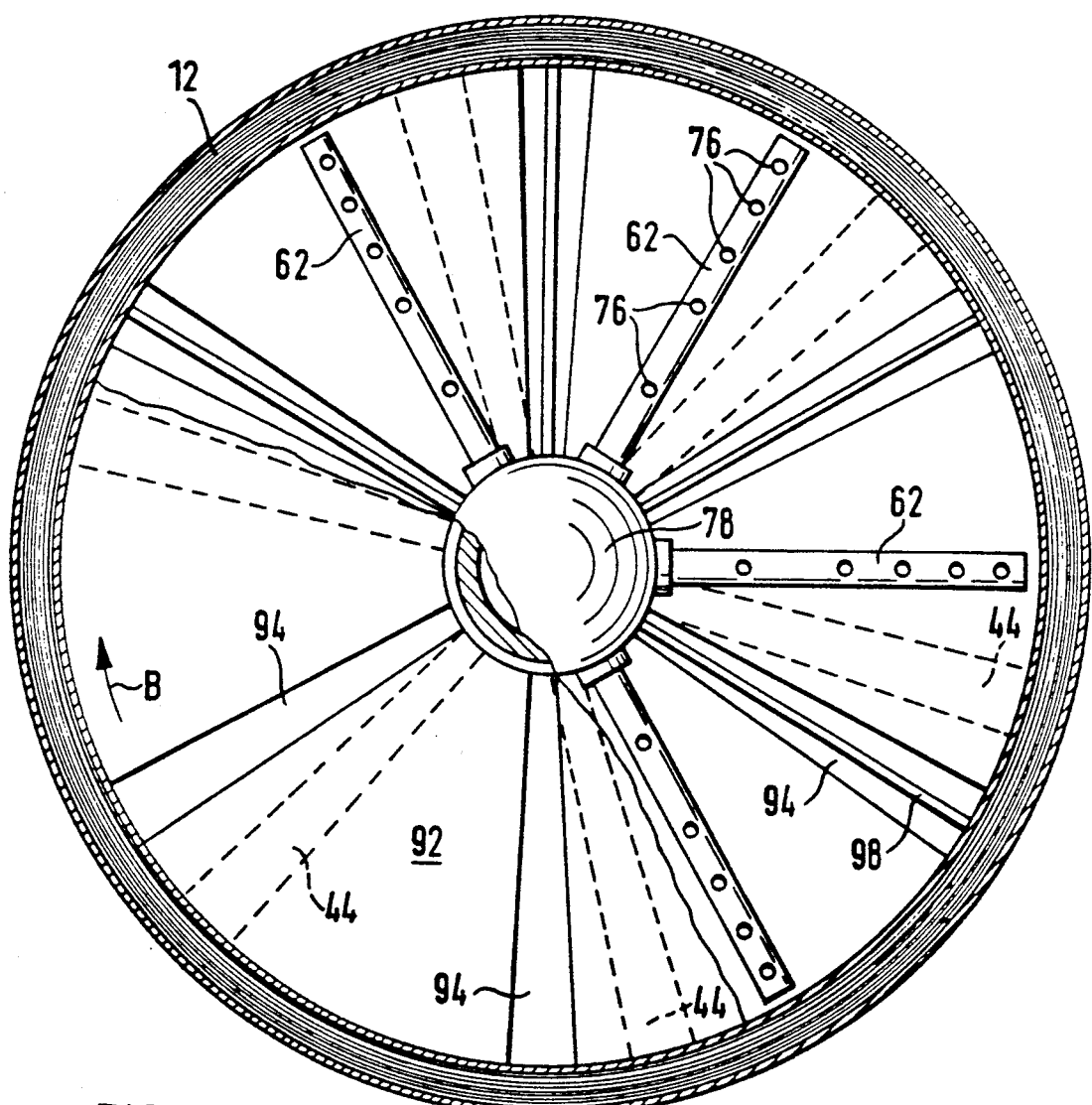
Figure 6:
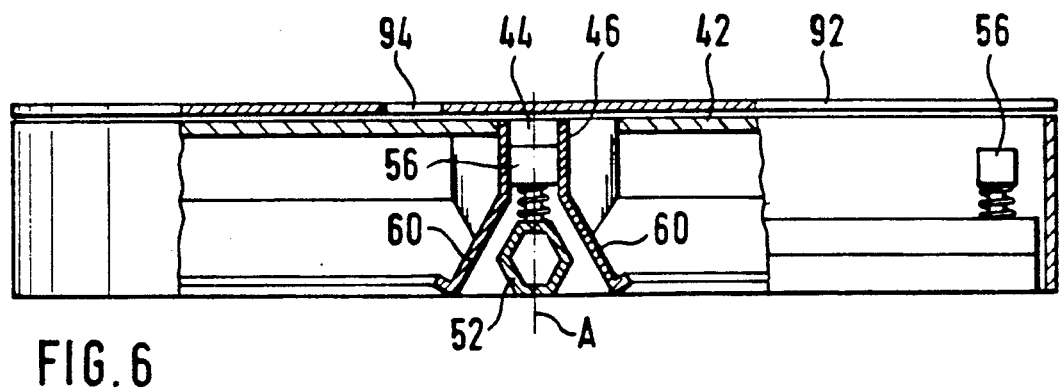
Figure 5:
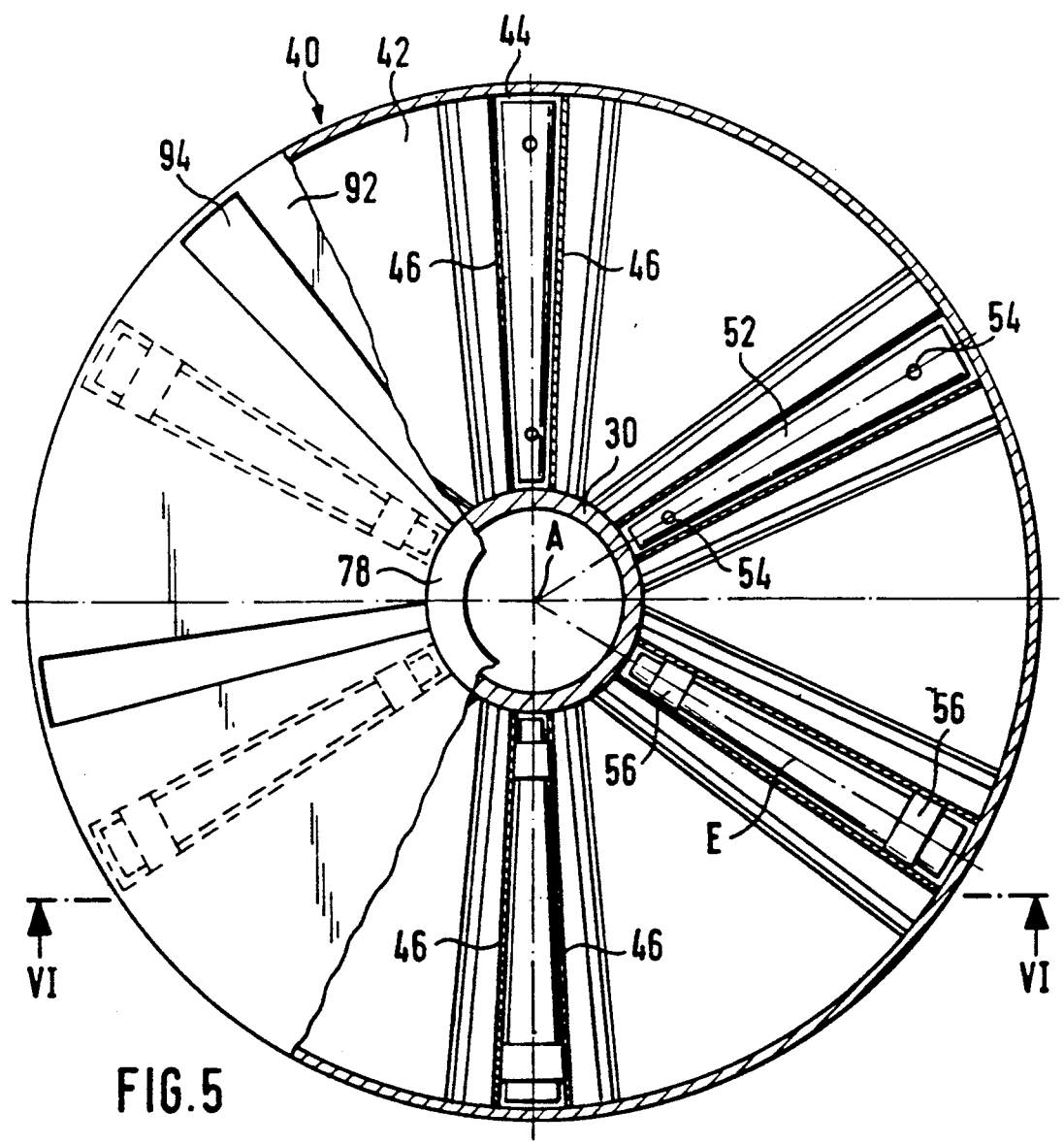

Each of the valve bodies 52 is arranged exactly centrally between two guide plates 60 which extend downwardly from the associated pair of side walls 46 and diverge downwardly in cross-section as shown in FIG. 2. Between each of the guide plates 60 and the associated valve body 52 a radial slot is left having a width which decreases when the valve body 52 is displaced upwardly against its own weight and against the pressure of the associated springs 58 due to an excessive pressure gradient between its lower side and upper side.

Secured at a distance above the rotor 40 to the shaft 30 are several arms 62 which each extend radially outwardly above one of the openings 44 up to the vicinity of the inner wall of the container 12. The number of arms 62 corresponds to the number of openings 44; thus, in the example illustrated six arms 62 are arranged offset with respect to each other by equal intervals of 60°. With respect to the operating direction B of rotation of the rotor 40 each of the arms 62 is slightly offset rearwardly with respect to the associated opening 44 arranged below it.

Each of the arms 62 has a tubular connecting piece 64 which is inserted into a radial bore of the shaft 30 and screwed tight with a nut 66. After releasing its nut 66 each arm 62 can be turned about its axis C radial with respect to the shaft 30. As FIG. 2 in particular shows the profile of the arm 62 is similar to the profile of an airfoil; it has a plane of symmetry D which intersects the plane of the rotor disc 42 approximately in the centre plane E of the associated opening 44.

Within each arm 62 a central passage 68 is formed and is connected via an axial passage 70 in the shaft 30 to the liquid inlet 36. A further passage 72 in each arm 62 is connected via a further passage 74 in the shaft 30 to the compressed air inlet 38. At an edge of each arm 62 directed obliquely upwardly with respect to the rotational direction B of the shaft 30 a plurality of nozzles 76 are arranged of which the axes lie in the plane of symmetry D of the associated arm 62 and extend at right-angles to the axis C thereof. The nozzles 76 are two-substance nozzles in which a liquid supplied through the liquid inlet 38 is sprayed with compressed air. The distances between every two nozzles 76 increase with increasing distance from the axis A so that in all regions of the treatment space 14 approximately identical liquid amounts per unit area are sprayed in.

The shaft 30 has a conical upper end 78 of which the tip extends into the region of the normal upper boundary of the substance 16 fluidized in the treatment space 14.

In accordance with FIGS. 1 to 6 a closure disc 92 coincident therewith lies directly on the rotor disc 42. The closure disc 92 is thus likewise circular and has six annular-sector-shaped openings 94 which are arranged at equal intervals from each other and which in an operating position of the closure disc 92 align completely with the openings 44 so that gas streams 50 can flow through the rotor 40 as if the closure disc 92 were not present. On forward rotation the closure disc 92 is held by a stop, not shown and for example a radial projection of the shaft 30, in such a manner that it turns with the rotor disc 42 without leaving its operating position. By a short reverse turning of the shaft 30 the closure disc 92 can however be turned with respect to the rotor disc 42 into a rest position which is also defined by a stop, not illustrated. In the rest position the closure disc 92 covers all the openings 44 of the rotor disc 42 and the latter covers all the openings 94 of the closure disc 92. As a result the container 12 is separated from the wind chamber 22.

Figure 8:
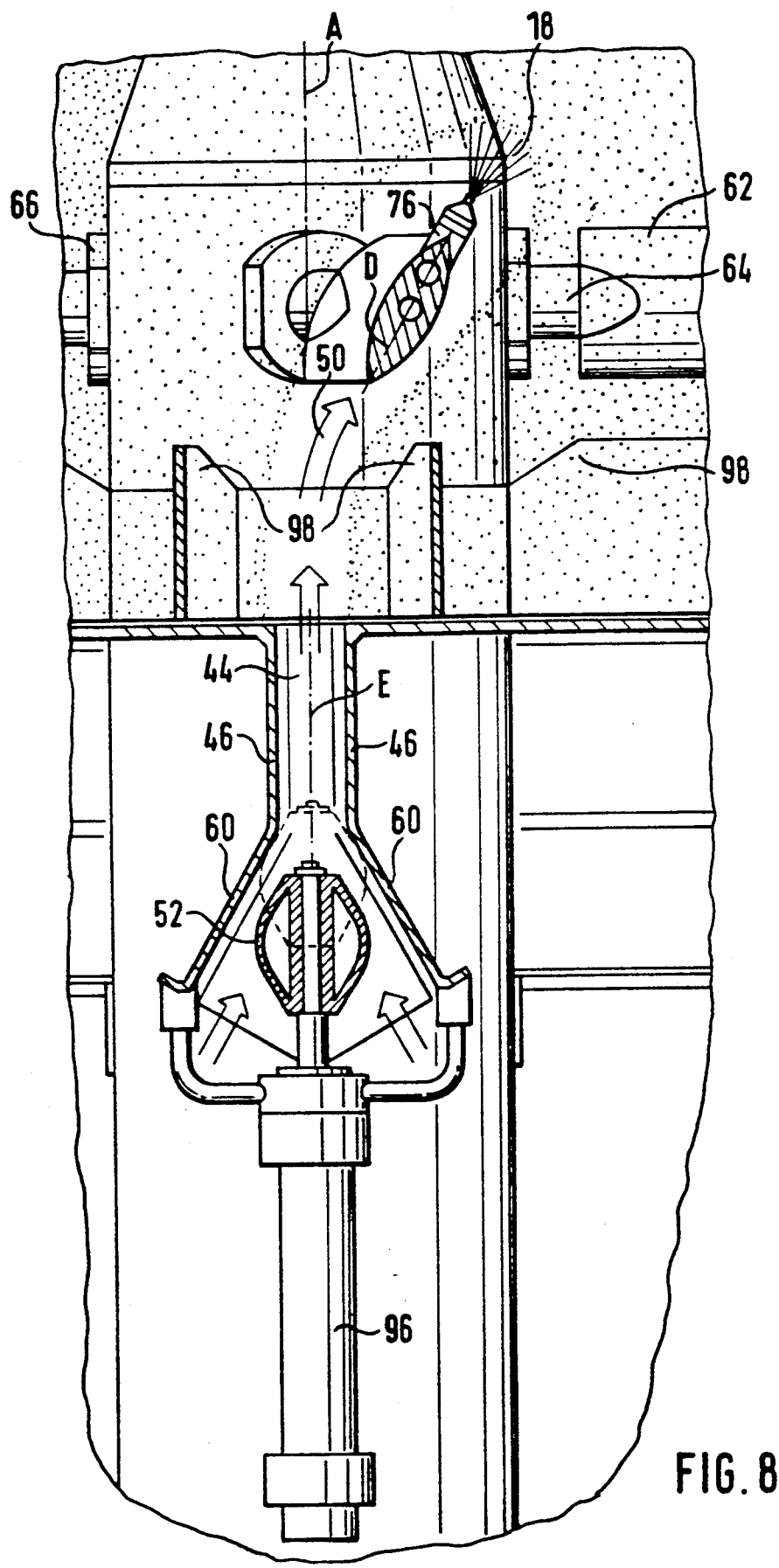

The example of embodiment according to FIGS. 7 and 8 differs from that of FIGS. 1 to 6 in that the valve bodies 52 are vertically adjustable by means of pneumatic piston-cylinder units 96 between their normal operating position shown in full lines in FIGS. 7 and 8 and a closure position indicated in dashed lines in FIG. 8. In the closure position each valve body 52 completely closes the opening 44 of the rotor 40 associated therewith so that the treatment space 14 is separated from the wind chamber 22. The piston-cylinder units 96 are controlled via a joint compressed air connection 97 arranged at the bottom of the shaft 30.

Both the examples of embodiment of the invention illustrated make it possible to introduce the substance 16 to be treated into the treatment space 14 in any desired manner, for example simply by pouring in, without parts of the substance being able to trickle into the wind chamber 22 and soil the latter. In operation however the openings 44 in the rotor 40, in both embodiments illustrated, give rise to sharply defined air streams directed upwardly at least approximately vertically and not obstructed by the closure means described.

Also common to the two examples of embodiment illustrated is that directly above the rotor 40 retaining blades 98 are stationarily arranged. The retaining blades 98 each lie in a plane containing the axis A, are mounted externally on the container 12 and held together radially inwardly by a ring 100 mounted on the shaft 30. Between the surface of the rotor disc 42 in the example of embodiment according to FIGS. 1 to 6 or the surface of the closure disc 92 in the example of embodiment according to FIGS. 7 and 8 and the lower edges of the retaining blades 98 there is a distance of preferably only a few tenths of a millimeter.

I claim:

1. In a fluidized bed apparatus for granulation of pulverulent substance comprising
   a container in which a treatment space is arranged for the substance and therebelow a wind chamber, and
   a rotor having a circular rotor disc which defines the wind chamber at the top, is rotatably drivable about an upright central axis and having at least one opening which is elongated in approximately radial direction and which permits a gas stream from the wind chamber into the treatment space, the improvement comprising
   construction of the rotor disc as a single partition between the wind chamber and the treatment space,
   a closure means coupled with each opening of the rotor disc which is open in normal operation but can be closed for stopping the apparatus,
   at least one retaining blade above the rotor disc stationarily arranged to prevent the substance lying on the rotor from rotating with the latter, and
   nozzles for spraying the substance in the treatment space arranged in each gas stream which has passed through one of the openings, said nozzles being distributed over the radial length of said stream and rotating therewith on rotation of the rotor.

2. Fluidized bed apparatus according to claim 1, wherein
   the closure means comprises a closure disc which is arranged coaxially with the rotor disc, is rotatable with respect to the latter and is likewise provided with at least one opening, and
   the openings of the two discs being aligned with each other in an operating position but being covered with respect to each other in a rest position of the two discs.

3. Fluidized bed apparatus according to claim 2, wherein
   the closure disc is arranged above the rotor disc and is freely rotatable with respect to he latter between stops in such a manner that
   the closure disc on forward rotation of the rotor assumes the operating position due to a braking action exerted on said disc by the substance, and on rearward rotation, assumes the rest position.

4. Fluidized bed apparatus according to claim 1, wherein each opening in the circular rotor disc has, as closure means, a valve body elongated in radial direction arranged therein.

5. Fluidized bed apparatus according to claim 4, wherein the valve bodies are arranged to be vertically adjustable on the rotor.

6. Fluidized bed apparatus according to claim 4, wherein the valve bodies are inflatable.

7. Fluidized bed apparatus according to any one of claims 1 to 6, wherein
   a plurality of radial retaining blades are arranged stationarily directly above the rotor.

8. Fluidized bed apparatus according to claim 7, wherein the retaining blades are connected together by at least one ring coaxial with the rotor.

9. Fluidized bed apparatus according to claim 4, wherein the or each opening of the rotor is defined by side walls which are each arranged in at least approximately vertical plane and the height of which is at least as great as their distance from each other and wherein the valve bodies are suspended beneath the associated side walls between two upwardly converging guide plates.

10. Fluidized bed apparatus according to claim 4 wherein the valve bodies are suspended beneath associated side walls between two upwardly converging guide plates.

11. Fluidized bed apparatus according to claim 1, wherein the or each opening of the rotor is defined by side walls which are each arranged in at least approximately vertical plane and the height of which is at least as great as their distance from each other.

12. Fluidized bed apparatus according to claim 11 wherein valve bodies are suspended beneath the associated side walls between two upwardly converging guide plates.

* * * * *